Figure 1:
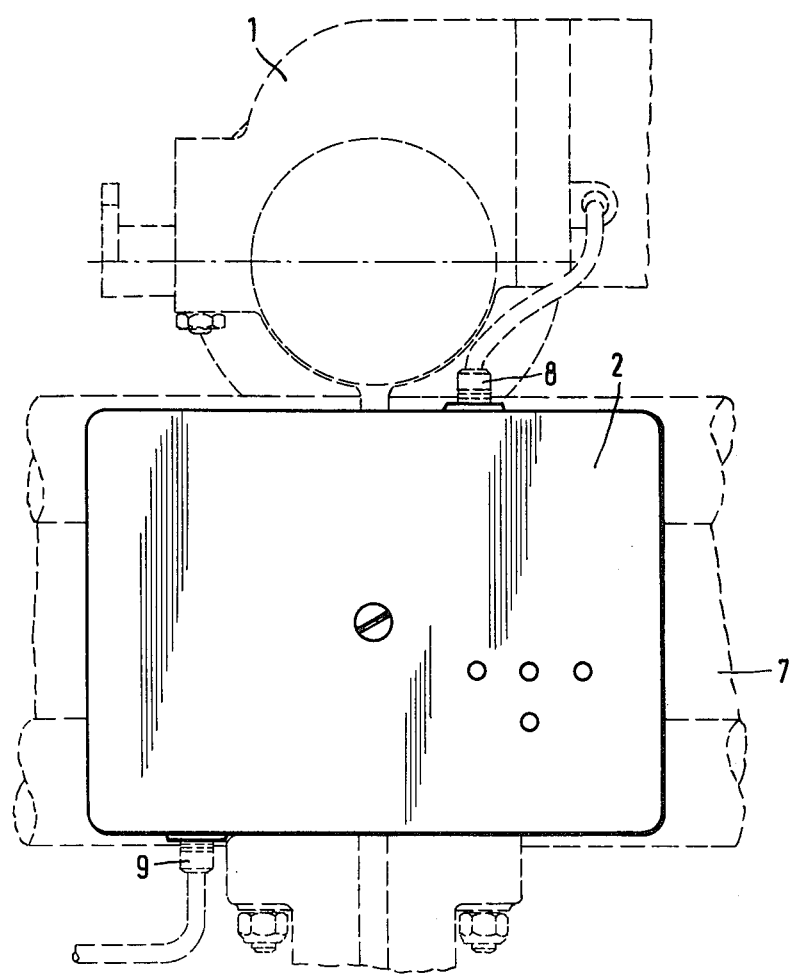

United States Patent [19]

Geng

[11] Patent Number: 4,488,015

[45] Date of Patent: Dec. 11, 1984

[54] DEVICE FOR POWER COLLECTION AND MOTOR CONTROL FOR OVERHEAD TROLLEYS

[75] Inventor: Manfred Geng, Grenzach-Wyhlen, Fed. Rep. of Germany

[73] Assignee: Blaser & Translift Gesellschaft Für Hebe-Und Förderanlagen mbH, Lucerne, Switzerland

[21] Appl. No.: 401,365

[22] Filed: Jul. 23, 1982

[30] Foreign Application Priority Data

Jul. 23, 1981 [DE] Fed. Rep. of Germany ... 8121649[U]

[51] Int. Cl.³ .............................. B60L 5/38; B61B 3/02
[52] U.S. Cl. .................................. 191/45 A; 105/150;
403/354; 403/380
[58] Field of Search ..................... 104/89, 93; 105/148,
105/150, 153; 191/45 R, 45 A, 48, 49, 50, 52,
59, 59.1; 248/221.3, 221.4; 403/345, 354, 380

[56] References Cited

U.S. PATENT DOCUMENTS

| 2,659,874 | 11/1953 | Veitch | 191/48 X |
|---|---|---|---|
| 3,625,158 | 12/1971 | Lorenz et al. | 105/150 X |
| 3,638,385 | 2/1972 | Nobels et al. | 403/380 X |
| 3,719,378 | 3/1973 | Windsor | 403/354 X |
| 3,855,941 | 12/1974 | Fromme et al. | 105/150 |
| 3,929,077 | 12/1975 | Benndahl | 105/150 X |
| 4,171,670 | 10/1979 | Roberts | 105/148 X |
| 4,286,698 | 9/1981 | Fischer | 191/49 |

FOREIGN PATENT DOCUMENTS

| 3012991 | 10/1981 | Fed. Rep. of Germany | 191/49 |
|---|---|---|---|
| 2363722 | 3/1978 | France | 403/354 |
| 11634 | of 1903 | United Kingdom | 191/48 |

Primary Examiner—David A. Scherbel
Assistant Examiner—David F. Hubbuch
Attorney, Agent, or Firm—Collard, Roe & Galgano

[57] ABSTRACT

The invention relates to an apparatus for power collection and for control of motors on a chassis of overhead trolleys. The apparatus includes a casing for receiving the control device, which is detachably mounted on the rear side of the overhead trolley chassis by means of a groove-snap lock. The casing is provided on its front side with a receiving device for receiving carbon brushes which engage the power tracks and serve to supply the power.

4 Claims, 2 Drawing Figures

DEVICE FOR POWER COLLECTION AND MOTOR CONTROL FOR OVERHEAD TROLLEYS

The invention relates to a device for power collection and for control of motors on a chassis of overhead trolleys.

In a hitherto known embodiment of overhead trolleys the power collection and the operation control is performed by carbon brushes which are disposed in the center area of the longitudinal part of a chassis and are pushed in a wiping manner against the power tracks which are mounted within the runway rail. Thereby, the control device is disposed in the area of the chassis. Elaborate precautions must be taken for replacing the power collection unit and, if need be, for replacing the control device, so as to have access to the mentioned devices. Consequently, relatively long idle times were required.

In fully automatically operated overhead trolleys within interlinked systems the shortening of idle times caused by interferences is a cost factor which cannot be underestimated.

It is therefore an object of the invention to design the device for power collection and for control of motors on a chassis for overhead trolleys, so that they can be rapidly replaced in order that the idle time of the chassis is kept as short as possible and an interruption of the production does not occur.

For obtaining this object a device for power collection and for controlling a motor on a chassis of overhead trolleys is provided according to the invention which is characterized in that a box receiving the control device is mounted on the rear side of the overhead trolley chassis by means of a groove-snap lock which is provided on the front side with a receiving device for receiving carbon brushes which engages power tracks and serves to supply the power.

In accordance with a particular embodiment, a rib is provided on the rear side of the overhead trolley chassis which is provided with an outwardly protruding shoulder on which the box can be mounted by means of a corresponding recess.

Preferably, the box may be further provided with detachable plug-in connections for the motor on the opposite sides thereof and may also be provided with a drive up circuit.

The substantial advantage with the device, in accordance with the invention, is obtained in that the simple detaching and mounting of the control box with the integrated power collector shortens the idle time to such an extent that no interruption in the production occurs.

Figure 2:
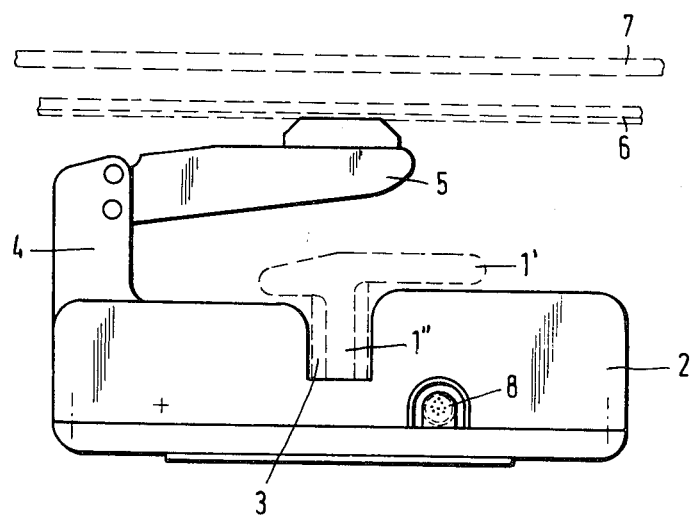

The device in accordance with the invention will now be explained in conjunction with the drawing with respect to a preferred embodiment. In the drawings:

FIG. 1 is a side view of the device in accordance with the invention on an overhead trolley illustrated in phantom line; and FIG. 2 is a plan view of the device in accordance with the invention.

Referring now in detail to the drawings, a box 2 is mounted on the rear side of an overhead trolley 1 which receives the power collection device and the control device for the motor of the overhead trolley chassis 1.

In accordance with the invention the box 2 is connected with rib 1' (FIG. 2) of the chassis by means of a corresponding recess and a groove-snap device 3. For this purpose, rib 1' is provided with an outwardly protruding shoulder 1'' which forms the groove snap device in cooperation with the recess of box 2.

A device 4 for receiving the carbon brushes 5 is provided on the front side of box 2, whereby the carbon brushes are pushed in a wiping manner against the power track 6 which runs parallel to rib 7 of the drive and support track. A plug-in connection 8 is provided on the upper side edge and a plug-in connection 9 is provided on the lower side edge which provide the electrical connection to the motor and to the so-called drive-up circuit.

Due to the simplicity of its construction and operation, in case of the wear of the carbon brushes, which could lead to a stopping of the chassis, box 2 is pulled out in a simple manner from the snap lock 3 by detaching the plug-in connections 8 and 9 and is replaced by a new operable box 2. Due to the simple detaching and reconnecting of the box, the idle time of the chassis is shortened in such a manner that no production interruption occurs.

I claim:

1. In an overhead trolley system having a rigid rail structure including at least one power track, an electrically driven overhead trolley mounted on said rail structure including a trolley chassis having a rear side facing away from said rail structure, and at least one carbon brush engageable with a respective one of said at least one power track and carried by said overhead trolley, the improvement comprising:
   a casing, said casing having a front side facing said at least one power track of said rail structure, a top side and a bottom side;
   snap-lock means for releasably mounting said casing to the rear side of said trolley chassis; and
   said at least one carbon brush carried on the front side of said casing in engagement with said at least one power track.

2. The overhead trolley system as defined in claim 1, wherein said trolley chassis includes a vertically extending rib disposed on the rear side thereof, said rib having an outwardly protruding shoulder, and said casing having a recess in which said shoulder is engageable in a snap fit manner, so that said shoulder and recess define said snap-lock means.

3. The overhead trolley system as defined in claim 1, wherein a plug-in connection for the electrically driven overhead trolley is provided on said casing.

4. The overhead trolley system as defined in claim 3, wherein said casing includes a plug-in connection on the top side thereof and a plug-in connection on the bottom side thereof.

* * * * *